J. PENNEY.
COW TAIL HOLDER.
APPLICATION FILED JULY 19, 1912.
1,051,756.
Patented Jan. 28, 1913.
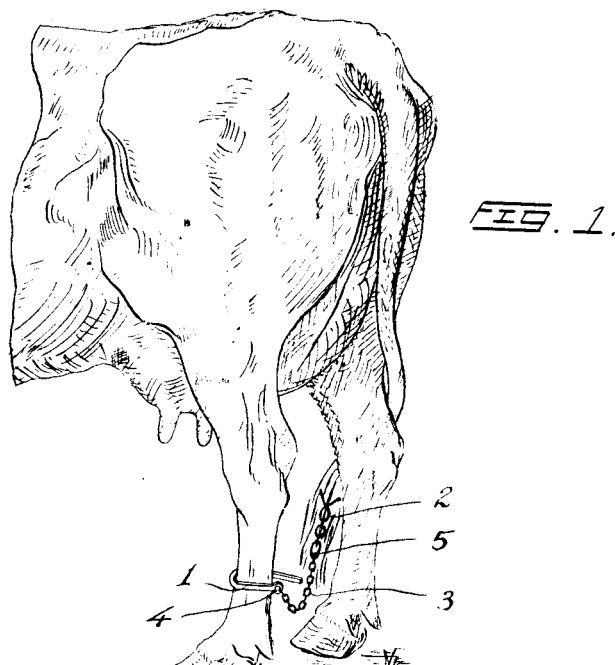
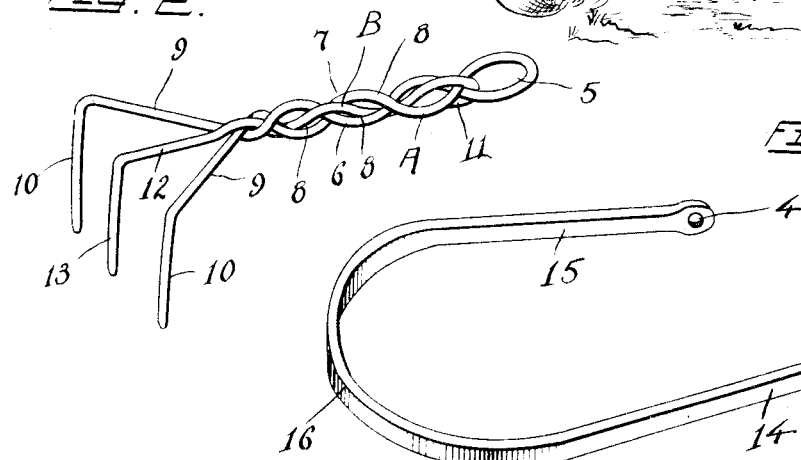
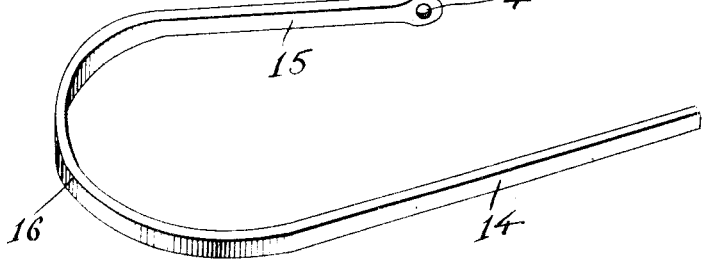
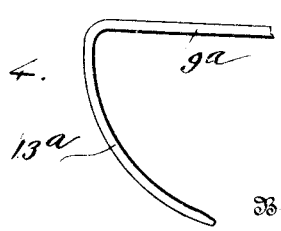
Witnesses
P. M. Hunt.
C. L. Evans.
Inventor,
John Penney.
By Victor J. Evans.
Attorney

UNITED STATES PATENT OFFICE.

JOHN PENNEY, OF THORNDIKE, MAINE.

COW-TAIL HOLDER.

1,051,756.

Specification of Letters Patent.

Patented Jan. 28, 1913.

Application filed July 19, 1912. Serial No. 710,465.

*To all whom it may concern:*

Be it known that I, JOHN PENNEY, a citizen of the United States, residing at Thorndike, in the county of Waldo and State of Maine, have invented new and useful Improvements in Cow-Tail Holders, of which the following is a specification.

This invention relates to cow tail holders to be used upon the animal when she is being milked and has for an object to provide a device of this character which may be readily applied to or removed from the animal and which will positively prevent the animal from switching her tail so as to prevent contamination of the milk by foreign particles which are usually brushed from the cow through switching of the tail.

In the drawing forming a portion of this application, and in which like letters of reference indicate similar parts in the several views:—Figure 1 is a perspective view showing the application of the invention. Fig. 2 is a perspective view of the tail clamp. Fig. 3 is a perspective view of the leg hook. Fig. 4 is a side elevation of a portion of the grapple showing a slightly modified form of the same.

The device comprises an end leg hook 1, a tail grapple 2 and an intermediate flexible connection 3, the latter having one of its ends connected in the eye 4 of the leg hook 1 while the opposite end of said element is connected in an eye member 5 of the tail grapple 2.

The tail grapple comprises two single strands of wire A and B, the former having intertwisted side portions 6 and 7 presenting the hereinbefore described end eye 5 and being also arranged relatively so as to define eyes 8. At the free terminals the portions 6 and 7 of the wire A are extended outwardly in converging relation to present shanks 9 which terminate in substantially right angularly disposed spurs or tines 10. The wire B is intertwisted with the companion portions 6 and 7, being preferably threaded through the eyes 8 and permanently connected through the medium of a hook 11 with walls of the eye 5. At the opposite end the wire B is extended forwardly between the shanks 9 so as to present a similar shank 12, the latter having a spur or tine 13 which is identical in construction with the hereinbefore described spurs 10.

The hook 1 is preferably constructed of a single piece of metal having spaced portions 14 and 15 and a connecting bight 16, the portion 15 being connected with the flexible connection 3 as shown. The portions 14 and 15 are flared relatively so that the space therebetween decreases toward the open end of the hook. This arrangement lends elasticity to the hook and the portions 14 and 15 are made to yieldingly engage the leg of the animal so as to be held against accidental displacement therefrom. With a view to facilitating the attachment of the hook to the leg of the animal the free terminal of the portion 14 is extended considerably beyond the eye 4 of the portion 15, being adapted to initially engage against the leg of the animal when applying the hook whereby to serve as a guide as will be understood.

In using the device the hook 1 is placed around the leg of the animal as shown in Fig. 1. The tines of the grapple are then carried through the tail and they are made to engage with the matted portions of the hair in such manner as will maintain an operative association of the tines therewith.

In the modified form of the invention shown in Fig. 4 the grapple has its shanks 9ª provided with spurs or tines 13ª which are curved downwardly and then rearwardly in the direction of the eye of the grapple whereby to facilitate the engagement of the tines in the tail of the animal and to effect a more substantial purchase with the matted portions of the hair. As a consequence of this construction it is evident that the grapple will be held against accidental separation from the tail.

I claim:—

1. A cow tail holder comprising a member adapted to be engaged with one leg of the animal, a flexible element carried thereby, and a grapple carried by said element and comprising two separate strands of wire having intertwisted portions and terminating beyond said portions in relatively flared shanks, and spurs carried by said shanks.

2. A cow tail holder comprising a grapple constructed of two strands of wire, one of said strands having separate intertwisted portions defining eyes therebetween, the other strand being threaded through the eyes and having one terminal secured to the first strand, tail engaging spurs carried by the first and second named wires, and a leg engaging member connected with the grapple.

In testimony whereof I affix my signature in presence of two witnesses.

JOHN PENNEY.

Witnesses:
　EDWARD G. COX,
　WALTER H. YOUNG.